United States Patent [19]
Holtsclaw et al.

[11] 3,750,861
[45] Aug. 7, 1973

[54] SELECTIVE DISCHARGE FEED CONVEYOR

[76] Inventors: Robert G. Holtsclaw; Jerrell D. Holtsclaw, both of Switz City, Ind. 47465

[22] Filed: Dec. 13, 1971

[21] Appl. No.: 207,201

[52] U.S. Cl. ............... 198/159, 198/83, 198/204
[51] Int. Cl. .................................... B65g 15/04
[58] Field of Search ............. 198/207, 205, 159, 198/84, 85, 83, 204; 222/55

[56] References Cited
UNITED STATES PATENTS

| | | | |
|---|---|---|---|
| 3,286,862 | 11/1966 | Hansen | 198/159 X |
| 3,146,909 | 9/1964 | Sawada | 222/55 |
| 3,178,011 | 4/1965 | Oshanyk | 198/207 |
| 1,475,596 | 11/1923 | Redler | 198/159 |

*Primary Examiner*—Richard E. Aegerter
*Assistant Examiner*—H. S. Lane
*Attorney*—Verne A. Trask et al.

[57] ABSTRACT

A single-chain feed conveyor having a series of flights on a central bottom chain, which normally discharges at its forward end, is modified to provide discharge at intermediate points. A shroud at the forward discharge end has an open condition in which it permits normal forward-end discharge, and has a closed condition in which it forms a return bend channel to guide the conveyed material to the return trough containing the return stretch of the conveyor chain. The returning flights then convey the material along the return trough to an opening in any desired point therein. Leveling means over the forward-conveying trough levels any large clumps of conveyed material, such as silage, to prevent overloading the return bend shroud, and such shroud is shaped with wide clearance at the top and close clearance at the bottom with respect to the conveyor flights as they swing about the sprocket at the discharge end.

15 Claims, 7 Drawing Figures

SELECTIVE DISCHARGE FEED CONVEYOR

BACKGROUND OF THE INVENTION

Single chain conveyors are widely used to convey feed such as silage or haylage from a silo or other storage container to feed bunks accessible to the cattle or other stock. Such a conveyor consists of a series of flights carried by a single detachable-link chain along a forward conveying upper trough. The chain is trained about sprockets at opposite ends of the trough and returns from the forward discharge end of the conveyor to the rearward loading end in a return trough beneath the forward conveying trough. The chain is commonly driven from the discharge end, and may travel at relatively high speed, for example, 300 feet per minute.

Heretofore it has not been feasible to discharge conveyed material from such a conveyor at any point other than its normal forward end, and this has limited its usefulness. The present invention permits discharge at almost any point along the length of the conveyor and greatly increases its usefulness.

SUMMARY OF THE INVENTION

In accordance with the present invention the forward normal-discharge end of the conveyor is provided with a shroud having an open position in which it permits normal forward end discharge and a closed position in which it forms a return-bend channel to guide the conveyed material from the forward-conveying trough to the return trough. The material is then conveyed rearward in the return trough by the return stretch of the conveyor chain and its flights. In the return trough, the drive chain is at the top edge of the conveyor flights so that the conveyor spaces are unobstructed at the bottom and conveyed material will freely drop from the conveyor at any point along the return trough where a bottom discharge opening is provided. Reliable operation without jamming the return bend shroud is obtained by leveling the conveyed material as it travels along the forward-conveying trough and by suitably shaping the return-bend shroud.

Opening and closing the return bend shroud may be done either by providing a movable door or gate in a fixed shroud or by forming the shroud in its entirety as a movable element. The latter is preferred in order to minimize change in structure and operation of the conventional conveyor. A preferred return-bend shroud is pivotally mounted at the normal-discharge forward end of the forward-conveying trough of the single-chain conveyor, and is movable between a raised open position and a lowered closed position. The preferred return bend shroud has side walls forming a continuation of the conveyor trough and aligned with the side walls of the return trough, and has an outer curved wall lying opposite the path of the outer ends of the conveyor flights, with relatively large clearance from those flights at the top and close clearance at the bottom. Commonly, the flights are so spaced that two consecutive flights never lie closer than 180° from each other as they travel about the sprocket at the discharge end of the conveyor and through the return bend channel. The conveyed material is thrown forward and downward as the flights swing about the delivery sprocket and fall by gravity toward the bottom of the shroud where it is picked up again by the flights and conveyed into and along the return trough. To avoid overloading and jamming the return bend shroud, the conveyed material is desirably leveled by one or more leveling devices along the forward conveying trough so that by the time the material reaches the return bend shroud, there are no protruding large bumps or masses of conveyed material, such as commonly occur with silage and haylage.

BRIEF DESCRIPTION OF THE DRAWINGS

The accompanying drawings illustrate the invention. In such drawings.

DESCRIPTION OF THE SPECIFIC EMBODIMENT

Figure 1:
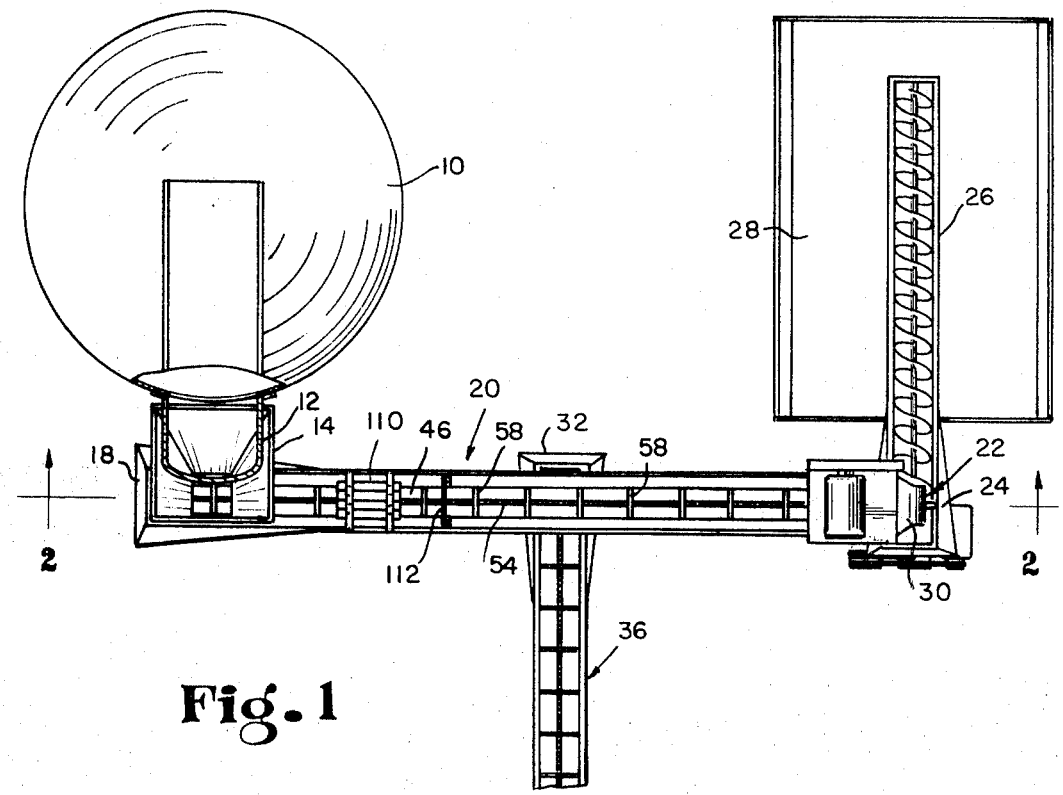
FIG. 1 is a somewhat diagrammatic plan view of a feed system employing a conveyor in accordance with the invention and having first and second discharge points.

The feed distribution system shown in FIG. 1 comprises a storage silo 10 from which silage is unloaded to a chute 12 through which it drops to a hopper 14. The hopper delivers it to a receiver 18 at the loading end of a single chain conveyor 20, which carries the silage forward, to the right in FIG. 1. The forward end 22 of the conveyor trough is normally open so that the silage is discharged at that forward end into the receiver 24 of a screw conveyor 26 which delivers the silage to and distributes it along a feed bunk 28. In accordance with the present invention, the discharge end of the conveyor 20 is provided with a return-bend shroud 30 which, when open, allows the conveyor to discharge normally to the receiver 24.

Figures 2, 3, 4:
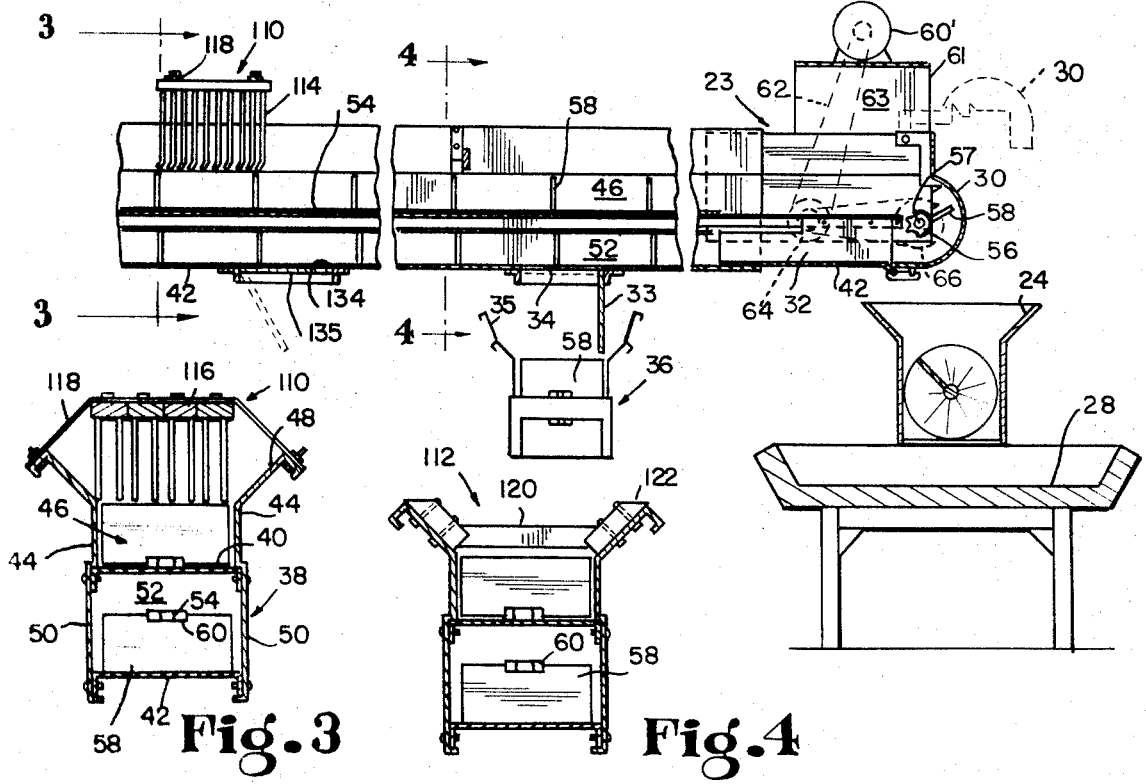
FIG. 2 is a vertical section of an enlarged scale taken on the line 2—2 of FIG. 1.
FIG. 3 is a section taken on the line 3—3 of FIG. 2 showing a primary leveling device.
FIG. 4 is a section taken on the line 4—4 of FIG. 2 showing a secondary leveling device.
Figure 5:
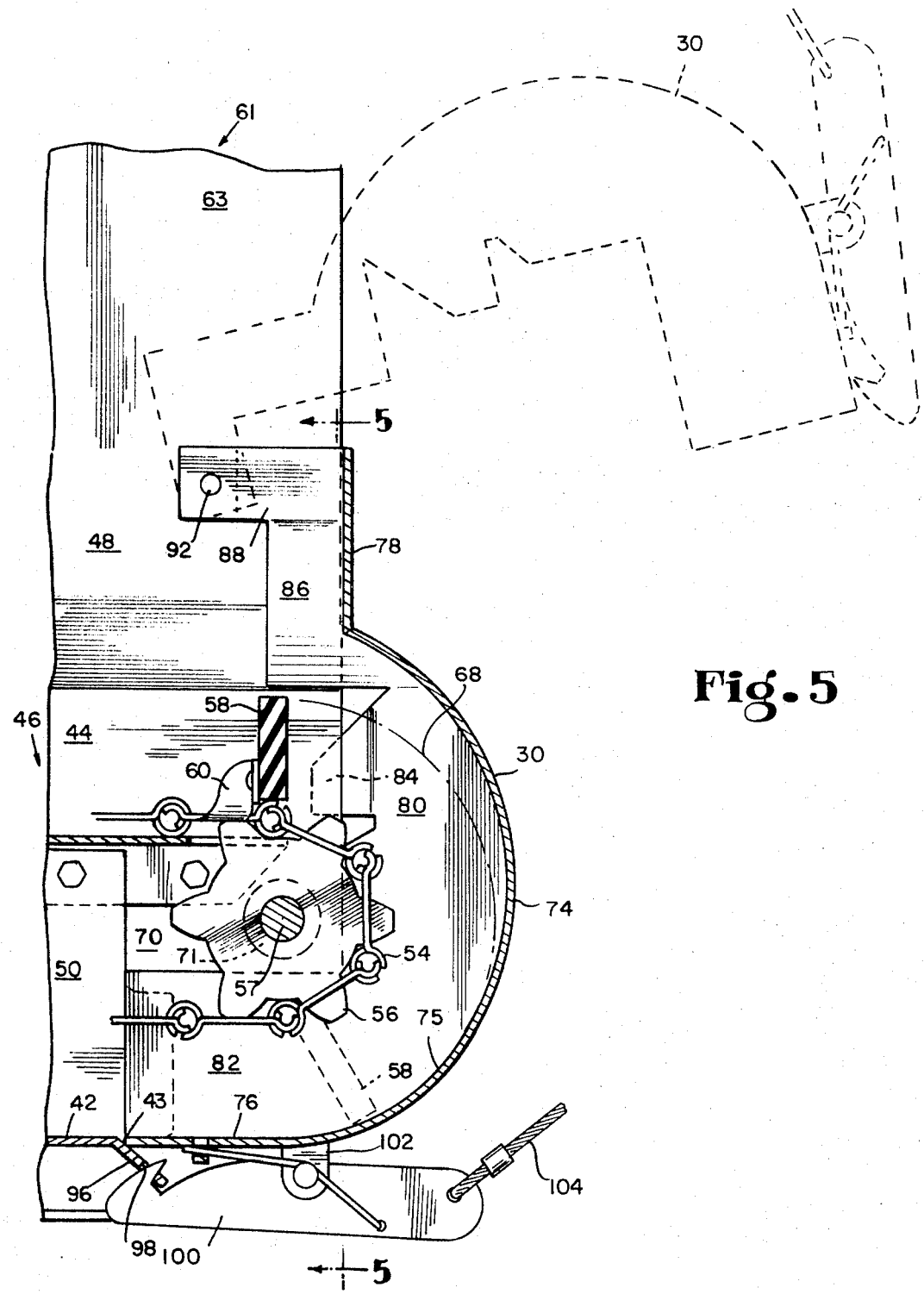
FIG. 5 is a longitudinal sectional view of the delivery end of the conveyor showing the configuration of the return-bend shroud and its relationship with the conveyor chain and flights.
Figure 6:
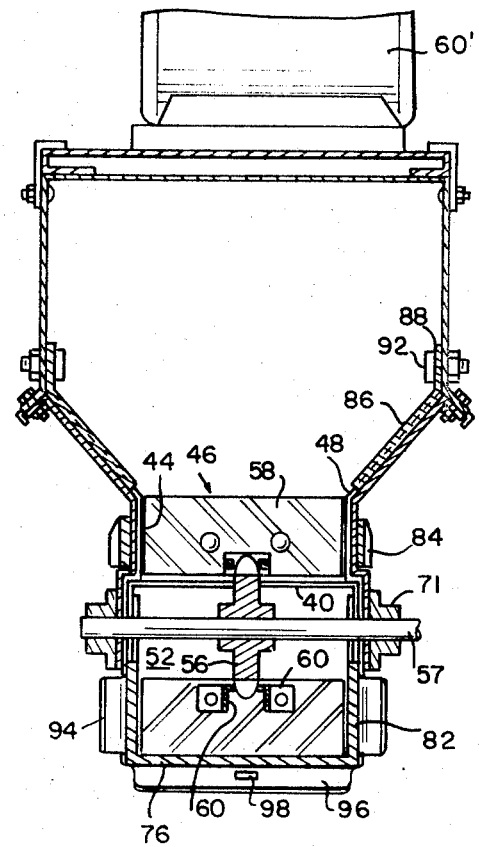
FIG. 6 is a section taken on the line 6—6 of FIG. 5, with drive mechanism omitted.
Figure 7:
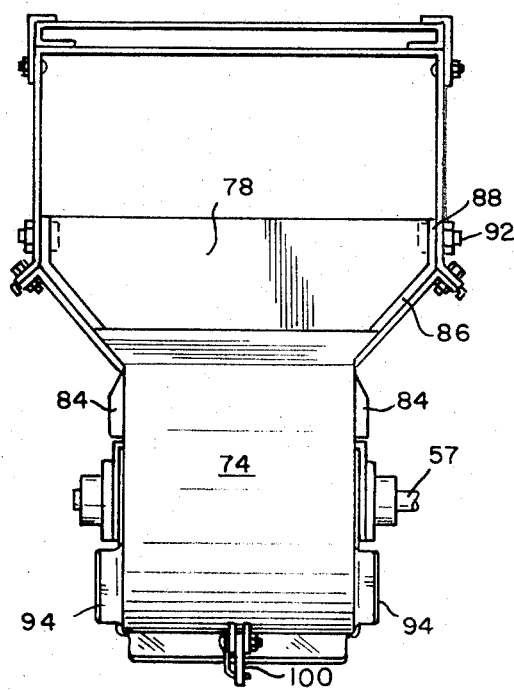
FIG. 7 is an end elevation of the conveyor with a return bend shroud mounted thereon.

When the shroud 30 is closed against the discharge end 22 of the conveyor 20, as shown in full lines FIGS. 1, 2, and 5, it forms a return bend chute or channel through which the conveyed material is delivered to the return trough 32 of the conveyor, to be conveyed along that trough to a discharge opening 34 or 134. At opening 34, it falls into the receiver 35 of a tranverse second conveyor 36 for conveying it to a second feed bunk (not shown).

The conveyor 20, as shown in FIG. 3, comprises a pair of formed side frame walls 38 joined and held in spaced relation by upper and lower decks 40 and 42. The side section walls 38 have portions forming straight vertical side walls 44 extending upward from the deck 40 to form an upper forward-conveying trough 46. The tops of the vertical walls 44 join outward sloping flank walls 48 for containing any excess material above the trough 46. The side sections 38 also include lower vertical walls 50 which are joined to the lower deck 42 to form a return trough 52.

A conveyor chain 54, desirably formed of detachable links, extends centrally along the deck 40 of the forward conveying trough 46, over a drive sprocket 56 at the discharge end of the conveyor, thence along a return stretch through the return trough 52 to an idler sprocket (not shown) at the loading end of the conveyor. The chain 54 carries a series of flights 58 in spaced relation. For example, the flights 58 may be carried by brackets 60 on every eighth link of the chain to form conveyor spaces having a length four or five times their depth. In the forward conveing trough 46, the chain is at the bottom of the flights 54 and rides along the deck 40. The flights are shaped to substantially slide on the deck 40 and have close clearance relation with the side wall sections 44. In the return trough, the flights are inverted, so that the chain 54 is at the top of the flights, and what were the tops of the flights are now the bottoms, and such bottom edges of the flights 48 ride on the lower deck 42. The conveyor spaces are thus downwardly unobstructed, and any conveyed material is retained therein solely by the bottom trough wall formed by the deck 42.

The conveyor is conventionally provided with an end section 23 which carries the drive and is longitudinally adjustable to tighten the chain. A drive motor 60' is mounted on a platform 61 carried by side walls 63 on the flank walls 48, and drive is by a belt 62 to a stepped pulley 64, thence by a belt to a drive pulley 66 fixed on the shaft 57 of the sprocket 56.

The end section, shown in FIGS. 2 and 5, has its bottom deck 42 and side walls 50 terminated at the point 43, well back from the sprocket 56 so that conveyed material will not normally be carried into the return trough. The deck 42 and walls 50 have outward bent flanges 94 and 96 at their edges to form entrance guides for the flights 58. The side frame walls 38 have side plates 70 which support bearings 71 for the sprocket shaft 57. The upper deck 40 extends substantially to the centerline of the shaft 57, level with the root of the sprocket 56, and is notched at the center to clear the sprocket. The side walls 44 and flange walls 48 of the upper trough 46 extend beyond the sprocket to contain and guide the conveyed material for discharge.

The conveyor 20 normally discharges at its forward end 22. For purposes of the present invention, this may be considered a first discharge point. To prevent discharge at this first discharge point, and to cause the conveyed material to travel further to a second discharge point, such as the discharge opening 34 in the return trough 52, the discharge end of the conveyor 20 is provided with a closeable shroud 30.

The return bend shroud 30 is shaped to receive the conveyed material from the forward-end of the upper trough 46 and to deliver it to the return trough 52 to be conveyed along that trough by the flights 58 of the conveyor in their return travel. At the forward end of the conveyor, the flights 58 swing about the sprocket 56 with their free edges traveling along a curved path 68 through 180°, and they change direction of travel from forward travel in the upper trough 46 to return travel in the lower trough 52. The flights 58 are normally spaced so that not more than one flight is traveling about the sprocket 56 along the curved path 68 at any one time.

The return bend shroud 30 shown comprises an outer wall 74 which has its lower edge received against the guide flange 94 and substantially aligned with the lower deck 42. From that deck 42, the wall extends in a horizontal section 76 to a point below the centerline of the sprocket 56, thence in a curved section 75 counterclockwise about the sprocket 56. In its lower quadrant, the curved section 75 is in close clearance or rubbing relation with the outer edges of the flights 58 as they travel along the curved path 68, and such close clearance desirably extends over a considerable arc, desirably of say 60° to 90° and preferably of about 70°, so that the close clearance is present over substantially the whole path of the flights as they sweep from horizontal to inverted position. The wall 75 then continues upward, through an upper quadrant, in progressively widening clearance from the flights, to the terminal edge of the flank walls 48, where it has wide clerance from the top edges of the flights. There, it joins a vertical wall 78 which extends up to a point at or above the top of such flank walls 48. The curved wall 75 and its extensions 76 and 78 are joined at their edges to side walls 80 which close the sides of the shroud. Such side walls 80 have lower sections 82 received against and within entrance guide flanges 94 and substantially aligned with the side walls 50 of the return trough 52, and lying in close fitting relation with or inside the bottom and end edges of the side plates 70. Above the plates 70, the side walls 80 carry tongues 84 which are bent outward to overlap the outer faces of the side walls 44 of the upper trough 46. Above those side walls 44, the walls 80 of the shroud have extensions 86 which slope outward in position to overlap the inner faces of the flank walls 48. These are joined at their upper edges to rearward extending arms 88 which stand beside the side walls 63 of the motor platform 61 and are pivoted to such walls 63 by bolts 92. The shroud 30 will swing as a unit from closed position as shown in full lines to raised or open position as shown in dotted lines.

To retain the shroud 30 in closed position and its bottom edge in alignment with the lower deck 42, the lower section of the outer shroud wall carries a latch lever 100 pivoted in brackets 102 and spring-pressed to latched position. The entrance guide flange 96 is provided near its end with an opening 98 to form a keeper slot for the nose without the latch lever between A rope tied to the opposite end of the latch lever 100 may be pulled to release the lever and raise the shroud 30 from closed to open position.

With at least some kinds of stock feed, especially the silage and haylage for which the invention is particularly useful, large clumps or masses tend to be present in the material fed to the conveyor. If these enter the restricted space between the path of the flights 58 and the outer wall of the shroud 74, they tend to jam the conveyor and to interrupt operation or cause damage. To prevent this, the conveyed material is desirably leveled during its forward travel along the conveyor to break up any such clumps. The leveling means shown comprises a primary leveler 110 mounted over the conveyor 20 near its loading end, and a secondary leveler 112 spaced forward from the primary leveler. The primary leveler 110 consists of a multiplicity of flexible tines 114 fixed in blocks 116 supported above the conveyor trough 46 by arched brackets 118 mounted on the flange walls 48. As shown in FIG. 2, the lower ends of the tines 114 may be bent rearward of the direction of conveyor travel so as to catch clumps of silage standing above the upper edge of the flights 58 and retain the same while a series of successive flights travels past the leveler tines to break up the clumps and distribute them in successive conveyor spaces.

The secondary leveler comprises a cross bar 120 extending between mounting blocks 122 bolted to the flange walls 48. This forms a rigid barrier to stop any heavy clumps of material which pass the primary leveler, and to co-act with the moving flights 58 to exert a shearing action on any such clumps to break them up and distribute them in the successive conveyor spaces.

Operation is as follows: Silage is delivered from the silo 10 by conventional unloading mechanism into the hopper 14 from which it is fed to the receiver 18 at the loading end of the conveyor 20. The material is conveyed along the conveyor, from left to right in FIGS. 1 and 2, and any clumps of material are broken up and leveled by the primary and secondary levelers as the conveyor flights travel beneath such levelers. When the return bend shroud 30 is in elevated open position as shown in FIG. 2, the conveyed material is discharged in conventional manner at the terminal end of the conveyor and drops into the receiver 24 of the screw conveyor 26, which conveys the material to, and distributes it along, the feed bunk 28 for consumption by cattle or other stock having access to that feed bunk. To divert the conveyed material from such terminal discharge and deliver it instead to the conveyor 36 for the second feed bunk (not shown), the return bend shroud 30 is lowered to its closed position shown in FIG. 5. The conveyed material will then not be discharged at the terminal end of the conveyor, and instead will be carried through the return bend shroud downward and rearward to the return trough 52. It will then be conveyed along that trough by the return travel of the flights 58, to the discharge opening 34, where it will drop from the conveyor spaces between the flights 58 through the opening 34 into the receiver 35 of the conveyor 36, which will carry the material laterally to the second feed bunk.

In the return bend shroud, the wide clearance at the upper part of the shroud freely admits the leveled conveyed material to the return bend channel formed by the shroud. The conveyed material will commonly be carried in the conveyor spaces in batches which tend to be crowded toward the rear of such spaces, and may stand a short distance above the tops of the flights 58. In the return bend shroud, the forward swinging movement of the flights 58 and the force of gravity causes the conveyed material to be thrown forward and downward in the return bend channel. The spacing between the flights 58 is sufficiently wide that as each flight carries its load into the return bend channel, the preceding flight will be approaching or have passed the bottom of the channel and in any event will be well into the area where the outer wall 74 has close clearance relation with the tops of the flights. Accordingly, the material carried into the return bend channel by each flight will not catch between the edges of the flight and the wide-clearance first quadrant of the curved wall 74 but will be thrown forward and down, will be deflected downward by the curved wall, and will fall into the lower quadrant of the return bend, where the close clearance relation exists. The material will not jam between the edge of any preceding flight and the outer wall because any such flight will already have passed the point of entrance into the close-clearance section. Also, the conveyed material will be thrown forward and away from the top edge of the following flight, and will fall substantially freely into the lower part of the return bend shroud where the close clearance relation exists before it is again picked up by the following flight, so that danger of jamming between the edge of that flight and the outer wall 74 will be avoided both at the top and at the bottom.

In the return trough 52, the chain is above the flights 58 and the conveyor spaces are downwardly unobstructed, so that the conveyed material will be carried in sliding contact with the bottom deck 42 and will drop from the conveyor at any point where an opening is provided in that deck 42. This permits wide flexibility in the selection of the discharge point. While the discharge opening 34 may be simply an open hole in the bottom deck 42 of the return trough 52, such opening may be provided with a closure door 33 to prevent discharge at that point and cause the conveyed material to be conveyed farther along the return trough 52 for discharge at a second opening 134, where a door 135 may be opened or removed to permit discharge at that point. The two alternative openings 34 and 134 may if desired be at opposite sides of the loading point for the conveyor, so that the same conveyor can deliver feed from a central loading point to discharge points in either direction from the loading point. The invention thus greatly increases the range of usefulness of single chain feed conveyors.

We claim:

1. A selective discharge conveyor for silage and the like, comprising walls forming a forward-conveying trough and a return trough, a sprocket or the like at the forward end of said troughs, a conveyor including a series of spaced flights connected to a chain or the like and movable forward along the forward trough, then about said sprocket and into and rearward along the return trough, the chain in said return trough being supported above the bottom edges of the flights and the conveyor spaces between the flights being downwardly open, drive means for driving the conveyor in said forward and return movement, wherein the improvement comprises a shroud about the forward end of the troughs and including a gate having an open position in which it provides an opening for discharge of conveyed material from the conveyor flights as the flights pass about the sprocket, said gate also having a closed position in which the shroud forms a return bend channel for guiding conveyed material from the forward trough to the return trough to be conveyed therealong by return movement of the flights, said shroud having an outer wall disposed in wide clearance relation with the top edges of the flights as they swing about the sprocket from upright position in the forward-conveying trough to horizontal position, and disposed in close clearance relation with said edges over the major and final portion of their further movement to inverted position and into said return trough, so as to cause the flights to pick up silage and the like in the bottom part of the shroud without engaging such material between the flights and said shroud, and means forming an opening in the bottom of the return trough through which conveyed material will drop from the downwardly open conveyor spaces.

2. A conveyor as in claim 1 in which the shroud forms the gate and is movable between open and closed positions.

3. A conveyor as in claim 2 in which the shroud is pivoted on an axis above the forward trough and is swingable upward away from the troughs to open position.

4. A conveyor as in claim 1 with the addition of means located along the forward-conveying trough for leveling the conveyed material before it enters the shroud.

5. A conveyor as in claim 4 in which the leveling means includes a plurality of leveling devices at spaced points along the forward-conveying trough.

6. A conveyor as in claim 4 in which the leveling means comprises an array of flexible tines mounted in depending relation over the forward conveying trough.

7. A selective discharge conveyor for silage and the like, comprising
walls forming upper and lower troughs,
sprockets or the like at the opposite ends of said troughs,
a conveyor including an endless series of spaced flights connected to a chain or the like and extending along the upper trough, about said sprockets and along the return trough, the chain in said return trough being supported above the bottom edges of the slights and the conveyor spaces between the flights being downwardly open,
drive means for driving the conveyor toward one end in the upper trough and toward the other end in the lower trough,
wherein the improvement comprises
a shroud about said one end of the troughs for forming a return bend channel for guiding conveyed material from the upper trough to the bottom trough to be conveyed therealong by movement of the flights toward said other end,
said shroud having an outer wall in wide clearance relation with the top edges of the flights as the flights begin their sweep through the bend and in close clearance relation therewith as the flights sweep through the bottom part of the bend, so as to cause the flights to pick up silage and the like in the bottom part of the shroud oithout catching such material betwe5n the flights and said wall.

8. A conveyor as in claim 7 in which the outer wall of the shroud lies at a progressively decreasing clearance distance from the path of the flights in their first quadrant of movement through the bend and in substantial contact with the flights as they sweep through the bottom quadrant of the bend.

9. A selective discharge attachment for a conveyor adapted to convey silage or the like and having a series of spaced flights carried by a chain or the like through an upper trough, thence in a reversing path about a sprocket or the like into a lower trough, comprising
a shroud adapted to be attached at the end of the conveyor to define a return bend to carry material from the upper trough, along the reversing path and into the lower trough, said shroud having side walls to contain conveyed material laterally, and an outer wall curved about the reversing path of the flights, said wall being formed to have large clearance from the flight path as the flights begin their reversing path and to lie in substantial contact with the flights as they sweep through the bottom portion of their reversing path, so as to cause the flights to pick up silage and the like in the bottom part of the shroud without catching such material between the flights and said wall.

10. A conveyor attachment as in claim 9 in which the outer wall has a downward deflecting portion opposite the path of the flights as they begin their swing through their reversing path, whereby the outer wall will clear excess material standing above the flights as they enter their reversing path, such material will be thrown against said deflecting portion as the flights swing forward in said path and will be deflected downward to the bottom of the bend, and will be picked up by the flights as they sweep through the bottom portion of their reversing path in contact with the bottom portion of the wall.

11. A conveyor attachment as in claim 10, with the addition of means to pivot the shroud for movement between a closed position in which it is operative as described and an open position in which it permits discharge of conveyed material from the end of the upper trough.

12. A conveyor attachment as in claim 11 with the addition of a latch lever for retaining the shroud in closed position, said lever having an operating arm movable in the direction of opening movement of the shroud, adapted to be engaged by a rope or the like whereby a pull on the rope will unlatch the latch and raise the shroud to open position.

13. A selective discharge conveyor for silage or the like, comprising
walls forming an upper forward-conveying trough and a lower return trough,
sprockets or the like at the ens of said troughs,
a conveyor including an endless series of spaced flights connected to a single central chain or the like and extending along the upper trough, thence in a reversing path about the forward-end sprockets, thence along the return trough and about the rear-end sprocket to the upper trough, the chain running along the bottom of the upper trough and along the top of the return trough, and
drive means for the conveyor,
wherein the improvement comprises
a shroud at the forward end of the troughs forming a channel for guiding conveyed material from the upper trough to the lower trough to be conveyed therealong by movement of the flights along such lower return trough,
said shroud having side walls to contain conveyed material laterally, and having an outer wall disposed opposite the discharge end of the upper trough and extending downward and inward about the path of the top edges of the flights as the flights sweep through their reversing path about the forward-end sprocket and into the return trough, said outer wall lying in substantial contact with such outer edges throughout at least the major and terminal portion of the bottom quadrant of the sweep of the flights through such reversing path, so as to cause the flights to pick up silage or the like in the bottom portion of the shroud substantially without catching such material between the flights and said wall,
said conveyor including means ahead of said bottom quadrant for causing said outer edges to be cleared of material which may be lodged thereon so that said edges will approach such bottom guadrant substantially free of lodged material.

14. A selective discharge conveyor as in claim 13 in which last named means includes leveling means along the forward conveying trough for removing excess material standing above the flights in their forward conveying movement.

15. A selective discharge coneyor as in claim 14 in which the outer wall of said shroud includes a deflecting portion opposite and spaced from the path of the conveyor flights as they begin their reversing path about the forward-end sprocket, so as to clear material standing above the flights as they enter their reversing path and permit such material to be thrown therefrom, and to deflect such material downward as it is thrown from the flights in their sweeping movement, whereby the flights will clear themsleves of limited amounts of lodged material before entering said bottom quadrant of sweep movement.

* * * * *

UNITED STATES PATENT OFFICE
CERTIFICATE OF CORRECTION

Patent No. 3,750,861    Dated August 7, 1973

Inventor(s) Robert G. Holtsclaw; Jerrell D. Holtsclaw

It is certified that error appears in the above-identified patent and that said Letters Patent are hereby corrected as shown below:

Col. 2, line 4, change "bumps" to -- lumps --.

line 14, change "of" to -- on --.

Col. 3, line 7, change "conveing" to -- conveying --.

line 14, change "48" to -- 58 --.

Col. 4, line 41, change "without the latch lever between" to -- of the latch lever 100 --.

Col. 7, line 45, change "oithout" to -- without --.

line 46, change "betwe5n" to -- between --.

Col. 8, line 34, change "ens" to -- ends --.

Signed and sealed this 26th day of February 1974.

(SEAL)
Attest:

EDWARD M. FLETCHER, JR.
Attesting Officer

C. MARSHALL DANN
Commissioner of Patents